G. H. KELLER.
STRAW-CUTTER.
No. 192,172.             Patented June 19, 1877.
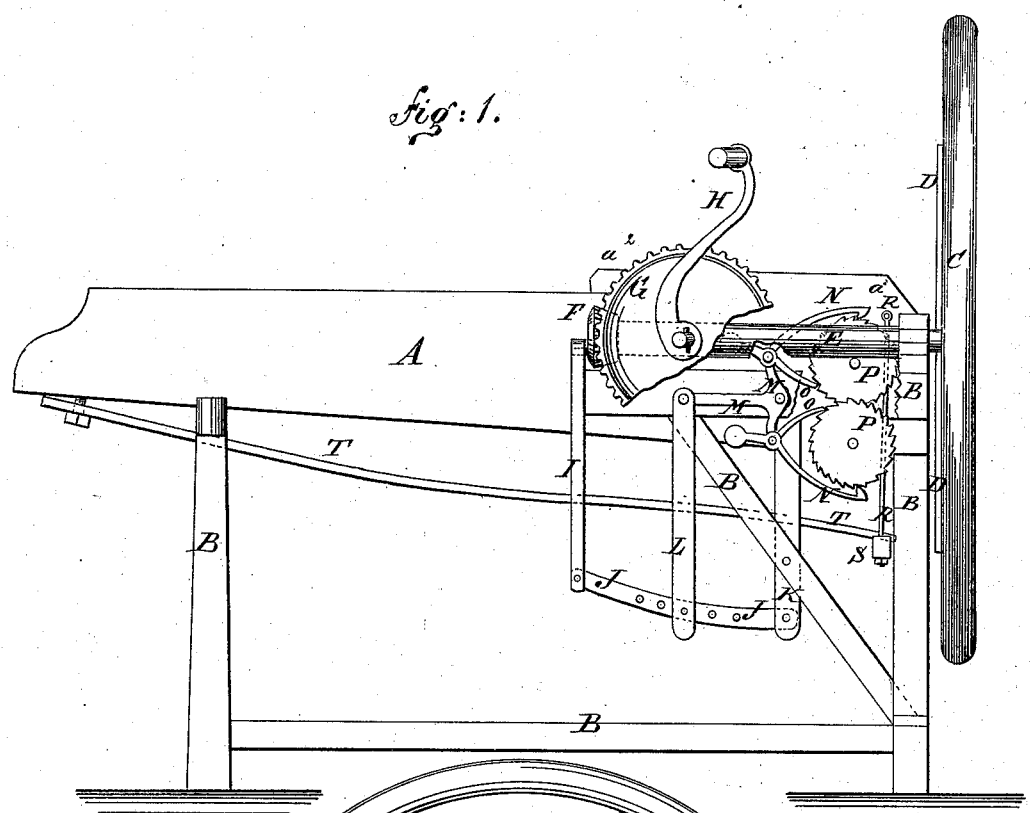
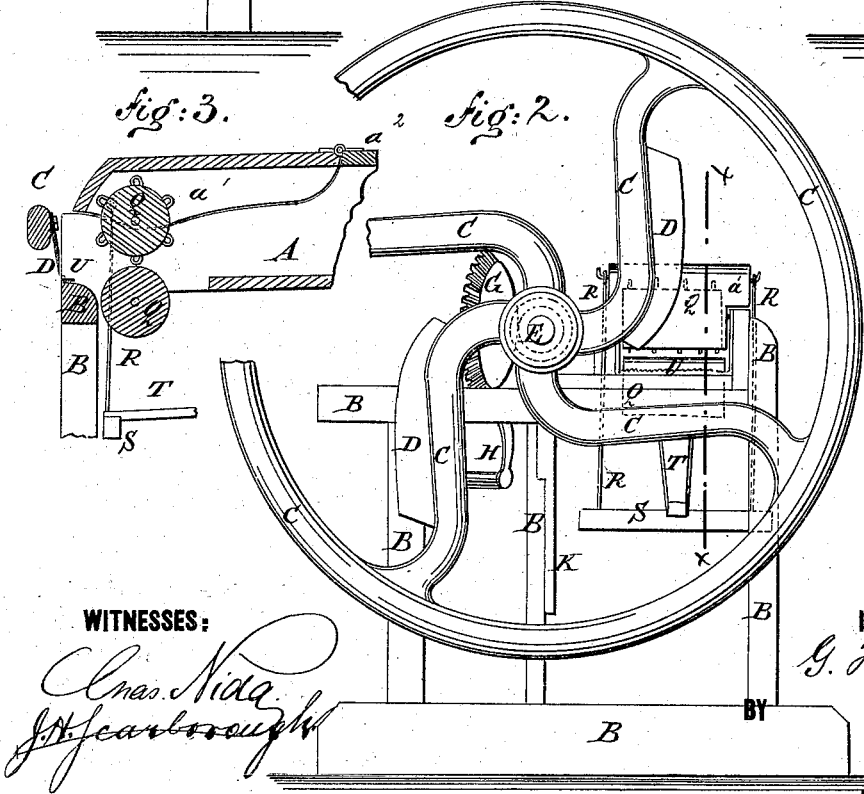

UNITED STATES PATENT OFFICE.

GEORGE H. KELLER, OF SHOTWELL, MISSOURI.

IMPROVEMENT IN STRAW-CUTTERS.

Specification forming part of Letters Patent No. 192,172, dated June 19, 1877; application filed March 19, 1877.

*To all whom it may concern:*

Be it known that I, GEORGE HENRY KELLER, of Shotwell, in the county of Franklin and State of Missouri, have invented a new and useful Improvement in Straw-Cutter, of which the following is a specification:

Figure 1 is a side view of my improved machine, parts being broken away to show the construction. Fig. 2 is a front view of the same. Fig. 3 is a detail section taken through the line $x\ x$, Fig. 2.

Similar letters of reference indicate corresponding parts.

The invention will first be described in connection with the drawing, and then pointed out in the claim.

A is the feed-box, which is secured to the top of the frame B. C is the fly-wheel, which is made heavy, and to its two opposite arms are attached two knives, D. The fly-wheel C is attached to the forward end of the shaft E, which is placed at the side of the feed-box A, and revolves in bearings attached to the frame B.

To the rear end of the shaft E is attached a small bevel-gear wheel, F, into the teeth of which mesh the teeth of the larger bevel-gear wheel G, which is pivoted to the frame B, and to which is attached the crank H, by means of which the machine is operated.

To the small bevel-gear wheel F is attached a crank-pin, to which is pivoted the upper end of a connecting-arm, I, the lower end of which is pivoted to the rear end of the lever J. The forward end of the lever J is pivoted to an arm, K, attached to the frame B.

To the lever J is pivoted the lower end of the connecting-rod L, several holes being formed in the lever J to receive the pivoting-bolt of the connecting-rod L, to enable said rod to be adjusted to regulate the feed. The upper end of the connecting-rod L is pivoted to the end of the middle arm of the three-armed lever M, which is pivoted at the point of meeting of its three arms to the side of the feed-box A.

To the upper and lower arms of the lever M are pivoted two pull-pawls, N, and two push-pawls, O, which operate upon the ratchet-wheels P, attached to the journals of the feed-rollers Q, so as to turn said rollers and feed the material forward as each knife D is approaching the end of the feed-box to make a cut.

The pawls N O, that operate upon the lower sides of the ratchet-wheels P, are provided with balancing-weights to hold their engaging ends up against the teeth of the said ratchet-wheels P.

The upper part $a^1$ of the forward end of the feed-box A is movable, and is hinged at its rear end to a cross-bar, $a^2$, attached to the top of the said feed-box A.

The lower feed-roller Q is pivoted to the lower stationary part of the forward end of the feed-box A, and the upper feed-roller Q is pivoted to the movable part of said end, so that it may adjust itself to the varying thickness of the material. The upper feed-roller Q, or both feed-rollers, may be provided with teeth to prevent it from slipping upon the material.

R are connecting-rods, the upper ends of which have eyes or hooks formed upon them, to hook upon pins attached to the movable part of the forward end of the feed-box A. The lower ends of the rods R are attached to the ends of a cross-bar, S, upon which rests the forward end of the spring T, the rear end of which is bolted to the rear part of the bottom of the feed-box A, so as to hold the upper roller Q down with the desired force upon the material, and at the same time allow the said roller to yield to accommodate itself to the varying thickness of the material being cut.

To the mouth of the feed-box A' is attached a steel bar, U, to prevent it from being worn by the friction of the material being cut, which bar is corrugated or toothed, to prevent the material from slipping upon it.

Having thus described my invention, I claim as new and desire to secure by Letters Patent—

The combination of the connecting-rods I L, the pivoted lever J, the three-armed lever M, and the pawls N O N O, with the ratchet-wheels attached to the journals of the feed-rollers and with the driving-gearing of the machine, substantially as herein shown and described.

GEORGE HENRY KELLER.

Witnesses:
GEORGE W. SCHWEER,
JOHN H. SCHWEER.